(12) United States Patent
Yoshida et al.

(10) Patent No.: US 6,631,547 B2
(45) Date of Patent: Oct. 14, 2003

(54) MANUFACTURING METHOD FOR THIN FILM MAGNETIC HEADS

(75) Inventors: Minoru Yoshida, Yokohama (JP); Hideaki Sasazawa, Yokohama (JP); Toshihiko Nakata, Hiratsuka (JP); Minoru Yamasaka, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 38 days.

(21) Appl. No.: 09/778,776

(22) Filed: Feb. 8, 2001

(65) Prior Publication Data

US 2002/0029459 A1 Mar. 14, 2002

(30) Foreign Application Priority Data

Sep. 14, 2000 (JP) ............................................ 00-285232

(51) Int. Cl.[7] ............................ G11B 5/127; H04R 31/00
(52) U.S. Cl. ............................... 29/603.09; 29/603.07; 29/603.16; 29/593; 29/833; 324/410
(58) Field of Search .......................... 29/603.07, 603.09, 29/593, 603.16, 417, 833; 324/210; 360/122, 125, 126

(56) References Cited

U.S. PATENT DOCUMENTS 5,483,734 A * 1/1996 Isono et al. ............... 29/603.09
5,646,682 A * 7/1997 Sogabe et al. ............... 348/135
5,754,376 A * 5/1998 Kobayashi et al. ..... 360/327.31
6,111,723 A * 8/2000 Takano et al. ............... 360/122
6,260,257 B1 * 7/2001 Emo et al. ................ 29/603.09
6,476,989 B1 * 11/2002 Chainer et al. ................ 360/31

FOREIGN PATENT DOCUMENTS

| JP | 8-241504 | 9/1996 |
| JP | 10-82616 | 3/1998 |

* cited by examiner

Primary Examiner—A. Dexter Tugbang
Assistant Examiner—Paul D Kim
(74) Attorney, Agent, or Firm—Mattingly, Stanger & Malur, P.C.

(57) ABSTRACT

To measure positions of a plurality of thin film magnetic head elements formed in a line on a bar, the quantity of positions of samples in the bar is estimated from the magnetic head elements the amount of deviation in position of the next element, and the distance between the elements are obtained, and the amount of deviation and distance are estimated by a primary approximate linear or several-order approximate curve. The estimated amount and the distance between the elements are moved simultaneously, and an image formed by a lens optical system is photo-converted to an image signal, and dimensions are computed. The conversion step is carried out immediately after movement of the next element and is continuously repeated, and the computing step is processed in parallel with the conversation step.

5 Claims, 15 Drawing Sheets

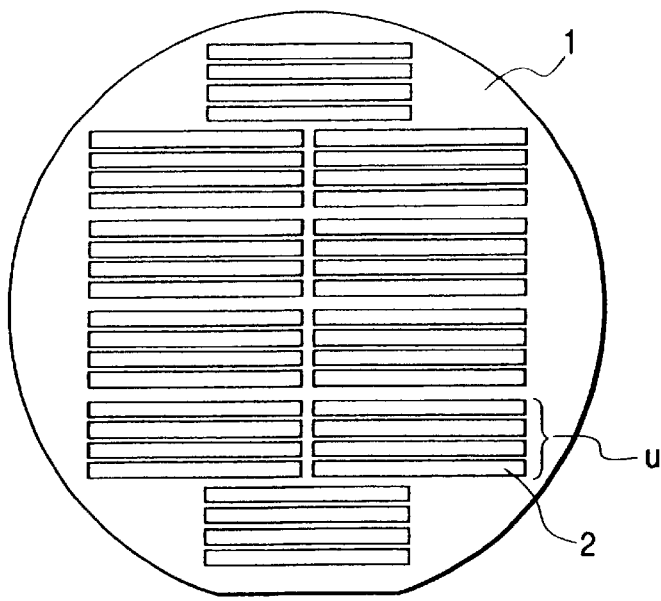
FIG. 2(a)
PRIOR ART
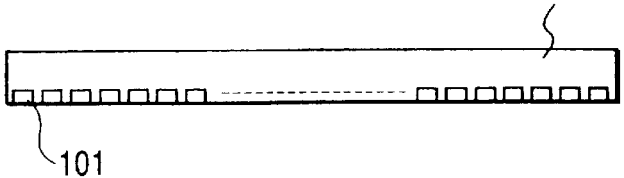
FIG. 2(b)
PRIOR ART
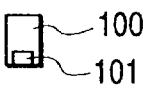
FIG. 2(c)
PRIOR ART
FIG. 3
PRIOR ART
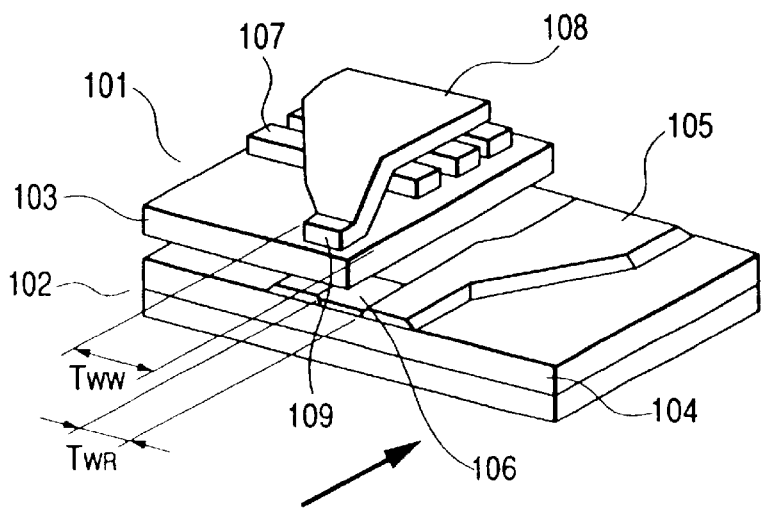

MANUFACTURING METHOD FOR THIN FILM MAGNETIC HEADS

BACKGROUND OF THE INVENTION

The present invention relates to a manufacturing method for a thin film magnetic head, an inspecting method for a thin film magnetic head, and an apparatus therefor, and particularly to a manufacturing method for a thin film magnetic head, an inspecting method for a thin film magnetic head, and an apparatus therefor including an inspecting step for measuring with high accuracy dimensions of track width of a magnetic recording element in the form of a bar formed from a plurality of elements cut out of a substrate.

Recently, smaller size and larger capacity magnetic recording disk drives have been developed, and at present, small magnetic recording disk drives using a disk having the sizes of 3.5 inch and 2.5 inch have occupied the mainstream. In such a small disk drive as described above, since a rotational speed of the disk is low, where a magnetic induction type magnetic head in which a read output depends on the disk speed is used, the lowering of the read output poses a problem. On the other hand, in a magneto resistive head (hereinafter called GMR head) using a magneto resistive element (hereinafter called GMR element, GMR: Giant Magento-resistive), since the read output does not depend on the disk speed, even the small magnetic recording disk drive whose rotational speed is low is able to obtain a high read output. Further, to provide the magnetic recording disk drive having higher recording density, it is necessary to have a narrower track which narrows the track width of the magnetic head. The GMR head is advantageous in that even in case of narrower track, a high read output is obtained as compared with the magnetic induction type magnetic head. It is contemplated from the foregoing that the GMR head is a magnetic head suitable for smaller size and larger capacity.

So, there has been proposed a laminated thin film head using the GMR head as a read-back head, and a magnetic induction type magnetic head as a recording head, respectively.

On the other hand, in order to realize higher recording density, in case of face recording density of 20 G bit/inch$^2$ of a magnetic disk, it is necessary that track width be about 0.7 to 0.5 micro meter ($\mu$m), and in addition, with respect to the accuracy, about ±0.07 to 0.05 micro meter ($\mu$m) is required.

To exceed 60 G bit/inch$^2$ for higher density, it is necessary that track width be 0.3 micro meter ($\mu$m) or less, and with respect to the accuracy, about ±0.03 micro meter ($\mu$m) is expected to be required. With the narrower track as described, it is has been difficult to inspect a track width in the process of manufacturing thin film magnetic heads.

First, the manufacturing method for the GMR head which is a thin film magnetic head will be described with reference to FIGS. 2(a) to (c). FIG. 2(a) is a top view of a wafer formed with the GMR element. The GMR element is formed by a thin film process represented by sputtering, exposure, ion milling and the like, in accordance with the method not shown. In the embodiment shown in FIG. 2, elements are patterned by a batch exposure, as one unit U. An element formed by the thin film process is cut in the rectangular shape and separated out of a wafer 1. FIG. 2(b) shows a group of elements in the rectangular shape (hereinafter referred to as a bar 2) separated out of the wafer. A single bar 2 is formed with a plurality of, for example, 30 GMR elements 101 (hereinafter referred to as an element 101). FIG. 2(c) shows a slider 100 having the element 101 cut out of the bar 2. The slider 100 is incorporated into the magnetic recording disk drive by the method not shown. The typical method for forming the GMR head is described in Japanese Patent Laid-open No. Hei 8-241504.

FIG. 3 is a sectional perspective view of the GMR head. In the figure, this side of the figure is a floating surface 102 of the element 101 with respect to the disk surface (not shown). An upper magnetic shield film 103 and a lower magnetic shield film 104 perform the action for enhancing signal resolving power. A signal from a magnetic disk (not shown) close to the floating surface 102 is read by a pair of signal detecting electrodes 105. A spacing between the signal detecting electrodes 105 is a read track 106, whose width is a read track width $T_{WR}$. A write coil 107 is formed on the upper magnetic shield film 10, and a write head 108 is formed above the write coil 107. An extreme end of the write head 108 is a write track 109 whose width is a write track width $T_{WW}$. These track widths are observed from the floating surface 102 (the arrow in the figure).

FIGS. 4(a) to 4(c) show the detail of the bar 2 after cut. FIG. 4(a) is a view as viewed form the side for carrying out element forming by the film process, that is, from the upper surface, and FIG. 4(b) is a view as viewed from the arrow of FIG. 4(a), that is, from the floating surface side. Various dimensions of the element 101 are measured from this direction. In FIG. 4(b), X-direction is the direction in which the elements 10 are continuously arranged, and Y-direction is the direction at right angle thereto. As described above, the bar 2 is in the rectangular shape; for example, in case of length: 50 mm, height: 15 mm, and thickness: 0.5 mm, the bar 2 is, generally, flexed like a bow as shown in FIG. 4(b) although different depending on the conditions at the time of cutting, and the flexing amount S thereof is often scores of micro meters ($\mu$m) in the central part.

FIG. 5 shows the procedure for measuring in accordance with the conventional measuring method. First, the bar 2 is set to observation means such as a microscope in a direction (the floating surface side) of FIG. 4(b) to observe the element 101. First, an image of a first element is obtained, and various element dimensions of the element 101 are computed. In case of not a final element, the bar 2 is moved by 1 pitch in the direction X to obtain an image of a next element. Where an element can be measured, element dimensions are computed. This operation is repeated to find all the element dimensions. However, since the bar 2 is flexed like a bow, it is sometimes that the element is not within the detecting range when an image is obtained merely by movement in the direction X, making it impossible to measure the element dimensions. In this case, it is necessary that to enable measurement of the element dimensions, the element is moved in a direction in which the bar 2 is flexed, that is, in the direction Y so that the element is within the detecting screen. Further, where a nanometer order is detected, an aberration of an optical system need also be taken into consideration. To this end, it is necessary accurately locate an element in the center of a field of view of an objective lens for which an optical aberration is best corrected.

This will be explained in more detail with reference to FIGS. 6(a) to (c). FIG. 6(a) is an image in which a first element is detected. Since it is necessary for detecting of element dimensions with high accuracy to detect the element 10 in an enlarged scale, a field of detecting of an image is about 20 micro meters ($\mu$m). The height of the element 101 is approximately 10 micro meters ($\mu$m). For example, the bar 2 is set in the direction Y so as to assume a height Y1 position within the measuring range 111. The bar 2 is stepwise moved in the direction X in order to detect next element as previously mentioned. FIG. 6(b) shows an image of an element in the vicinity of the center. Within the measuring range 111, the element 101 is detected downward due to the flexure of the bar 2 to assume a height Y2. Since in this state, the element 101 is not within the detecting range 111, it is impossible to measure element dimensions. Therefore, the bar 2 is moved in the direction Y, and moved so that the element 101 assumes a height Y3 within the measuring range 111, as shown in (c). As described above, in the conventional observing system, the element 101 is outside the detecting range due to the flexure of the bar 2 merely by the movement in the direction X, and therefore, observing means such as the bar 2 or a microscope is moved to a sensible position to compute element dimensions, thus taking two times or more for obtaining an image and for the computing time.

As a method for measuring element dimensions, there is a method that uses an optical microscope or a photo electric conversion sensor, and multiplies an area obtained from brightness data of a signal obtained from the photo electric conversion sensor by a suitable coefficient to obtain a desired width, as described in Japanese Patent Laid-Open No. Hei 10-82616.

FIG. 7 shows the procedure of element dimensions computing processing in the conventional apparatus. A focal position of observing means such as a microscope is adjusted to a camera, after which the camera is exposed to detect an image. The image is subjected to photo electric conversion and transferred to a memory. As described above, an element position is confirmed; and if element dimensions can be detected, various dimensions are computed. The result is displayed, after which the bar is moved in the direction X to detect a next element. This operation is shown as the measuring time of one element 500. As described above, where element dimensions cannot be detected in the vicinity of the central part of the bar, the bar is moved in the direction Y and a focal point of an optical system is adjusted again to a camera, after which an image of an element is detected. This operation is repetitively carried out until dimensions of an element can be detected. This operating time 501 is added to the measuring time of 1 element. When this computing processing flow is applied, each processing is performed in series, and therefore the measuring time is prolonged, failing to perform efficient measurement. Further, reduction in measuring time becomes difficult, and when exposure time of a camera is changed due to the change in light quantity, the measuring time is to change, failing to perform stabilized measurement.

In the method described in the prior art, where a bar formed with a plurality of elements is measured continuously, a position of an element becomes deviated vertically and is forced out of the detecting range, thus making it necessary to grasp the position of an element on all such occasions to correct it. To measure all the elements, several detectings per element are necessary, thus increasing the time required for the measurement of elements. Further, since movement of a bar, locating and the like are repeated, the detecting reproducing properties are also lowered. Further, since computing processing of elements is processed in series, the detecting time is prolonged, failing to perform efficient measurement.

SUMMARY OF THE INVENTION

According to the embodiments of the present invention described below, there can be provided a manufacturing method for a thin film magnetic head, an inspecting method for a thin film magnetic head, and an apparatus therefor including an inspecting step for measuring, efficiently, stably, and with high accuracy, dimensions of a track width of a magnetic recording element in the form of a bar formed by a plurality of elements cut out of a substrate.

That is, according to the present invention, the manufacturing method for a thin film magnetic head as described hereinafter is provided.

First, the invention disclosed in the embodiment is characterized by a manufacturing method for a thin film magnetic head comprising the steps of: forming a plurality of thin film patterns corresponding to a plurality of thin film magnetic head elements on a substrate; cutting the substrate formed with the plurality of thin film patterns to cut out a group of thin film magnetic head elements; measuring dimensions of a predetermined part of the thin film patterns for the group of thin film magnetic head elements separated; selecting a group of good thin film magnetic head elements on the basis of the result of measurement; and feeding the group of good thin film magnetic head elements selected to the next step wherein in the step of measuring dimensions, the thin film patterns are image-picked up, and the dimensions are measured from images of the thin film patterns obtained by image-picking up.

Preferably, in the inspecting step, dimensions corresponding to a track width of the thin film magnetic head are measured, the measurement of dimensions corresponding to the track width is carried out for all the thin film magnetic head elements constituting the group of thin film magnetic head elements, and the group of thin film magnetic head elements in which the dimensions corresponding to the track width are within the predetermined range is fed as the good product to the next step.

Preferably, in the inspecting step, dimensions corresponding to a track width of the thin film magnetic head are measured, and the measurement of dimensions corresponding to the track width is sequentially carried out for all the thin film magnetic elements constituting the group of thin film magnetic head elements.

Preferably, when the measurement of dimensions corresponding to the track width is sequentially carried out for all the thin film magnetic head elements constituting the group of thin film magnetic head elements, a position of a thin film magnetic head element to be measured next is estimated from positional information of the thin film magnetic head element measured previously.

The present invention further is characterized by a manufacturing method for a thin film magnetic head comprising the steps of: forming a plurality of thin film patterns corresponding to a plurality of thin film magnetic head elements on a substrate; cutting the substrate formed with the plurality of thin film patterns; image-picking up a section of the substrate cut to obtain an image of the section of the substrate including the plurality of thin film patterns; and measuring dimensions of a predetermined part of the thin film patterns from the image of a section of the substrate including the plurality of thin film patterns.

Preferably, in the step of measuring dimensions of a predetermined part of the thin film patterns, dimensions corresponding to a track width of the thin film magnetic head are measured, and the measurement of dimensions corresponding to the track width is sequentially carried out for all the thin film patterns on the substrate cut.

Preferably, when the measurement of dimensions corresponding to the track width is sequentially carried out for all the thin film patterns on the substrate cut, a position of a thin film pattern to be measured next is estimated from positional information of the thin film pattern measured previously.

Preferably, the result of the measurement of dimensions of a predetermined part of the thin film patterns is recorded on a schematic diagram for the thin film patterns on the substrate.

Furthermore, the present invention is characterized by an inspecting apparatus for a thin film magnetic head comprising: an illumination optical system for irradiating with illumination light a group of thin film magnetic head elements separated by cutting a substrate formed with a plurality of thin film patterns corresponding to a plurality of thin film magnetic head elements; image obtaining means for image-picking up the group of thin film magnetic head elements irradiated with illumination light by the illumination optical system to obtain an image of the group of thin film magnetic head elements; dimensions measuring means for processing the image of the group of thin film magnetic head elements obtained by the image obtaining means to sequentially measure dimensions of a predetermined part of the plurality of thin film patterns of the group of thin film magnetic head elements; and selection means for selecting a group of good thin film magnetic head elements on the basis of the dimensions of the predetermined part of the thin film patterns measured by the dimensions measuring means.

Preferably, the image obtaining means includes an objective lens for forming an image of the group of thin film magnetic head elements, and further includes a focusing optical system for focusing the objective lens into the thin film magnetic head.

Preferably, the illumination optical system irradiates the group of thin film magnetic head elements with either visible light, ultraviolet light or deep ultraviolet light, as illumination light.

Since the present invention is constituted as described above, in the production line in the GMR head forming process, high accuracy and short time measurement of a track width in the state formed to be bar-like become enabled, and it is possible to monitor the circumstances of the element forming steps in the in-process. Further, mapping in the wafer state is possible, and inconvenience of the process in the element step is found early to improve a process parameter whereby occurrence of inferior goods can be reduced, and high yield can be maintained.

These and other objects, features and advantages of the invention will be apparent from the following more particular description of preferred embodiments of the invention, as illustrated in the accompanying drawings.

BRIEF DESCRIPTION OF THE DRAWINGS

FIG. 2(*a*) is a plan view of a wafer showing the forming state of a bar on the wafer, FIG. 2(*b*) is a plan view of a bar-like head, and FIG. 2(*c*) is a plan view of the head;

FIG. 3 is a perspective view of a typical GMR head.

FIG. 4(*b*) is a side view of the bar-like head;

DESCRIPTION OF THE PREFERRED EMBODIMENTS

The embodiments of the present invention will be described in detail hereinafter with reference to the drawings.

For performing manufacturing by which the performance of a thin film magnetic head is stabilized and high yield is obtain, it is naturally necessary, in the manufacturing step for a thin film magnetic head, to stabilize the manufacturing process for a magnetoresistive layer and the like. However it is particularly necessary to measure track width in a short time and accurately, in the state of a bar cut from a wafer, to apply feedback to the manufacturing process quickly. In the present invention, therefore, a description will be made of a manufacturing method for a thin film magnetic head including the inspecting step capable of accurately measuring dimensions of elements such as track width in a short time and positively.

In the conventional measuring apparatus, since the bar is flexed in a direction at right angles to that elements are continuously arranged, the elements become deviated in position as the elements are measured by way of the step and repeat operation. So, detection is to be carried out while correcting the deviation, thus making it difficult to perform measurement in a short time and with high accuracy.

The present invention has been accomplished in view of such a restriction as mentioned above with respect to measured objects. First, a first embodiment will be described with reference to FIG. 1 and FIGS. 8 to 14.

Figure 1:
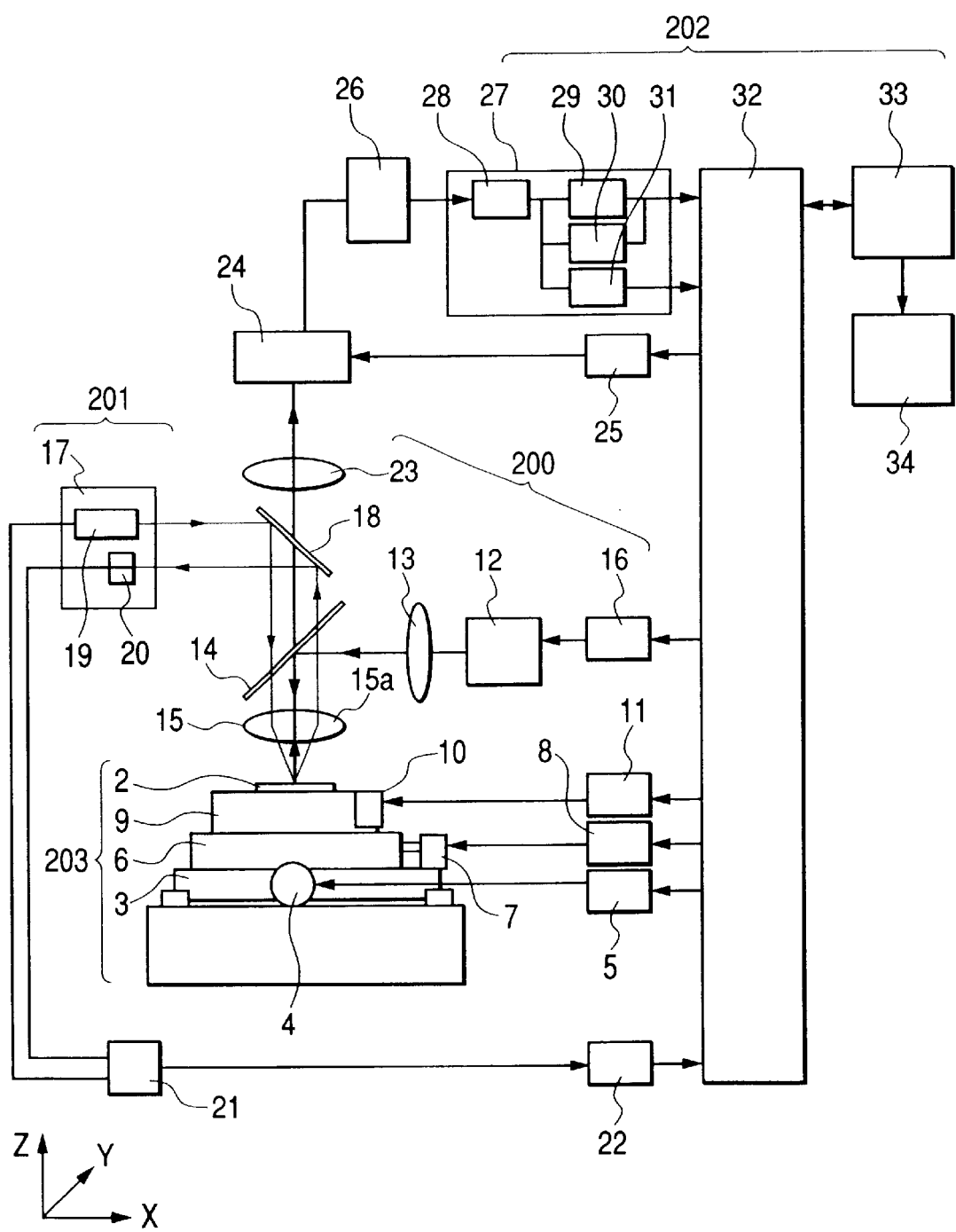
FIG. 1 is a front view showing the schematic constitution of a GMR head narrow track width measuring device (hereinafter abbreviated as a track width measuring device) according to a first embodiment of the present invention.
Figure 4A:
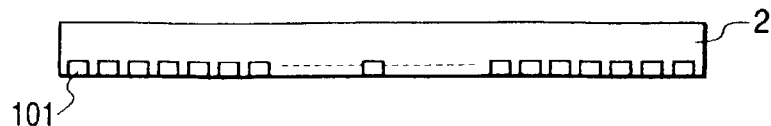
FIG. 4(*a*) is a plan view of a bar-like head.
Figure 4B:
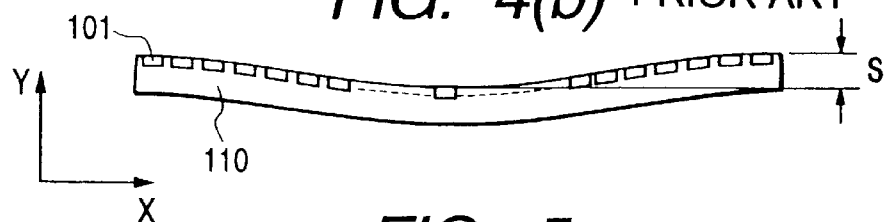
Figure 5:
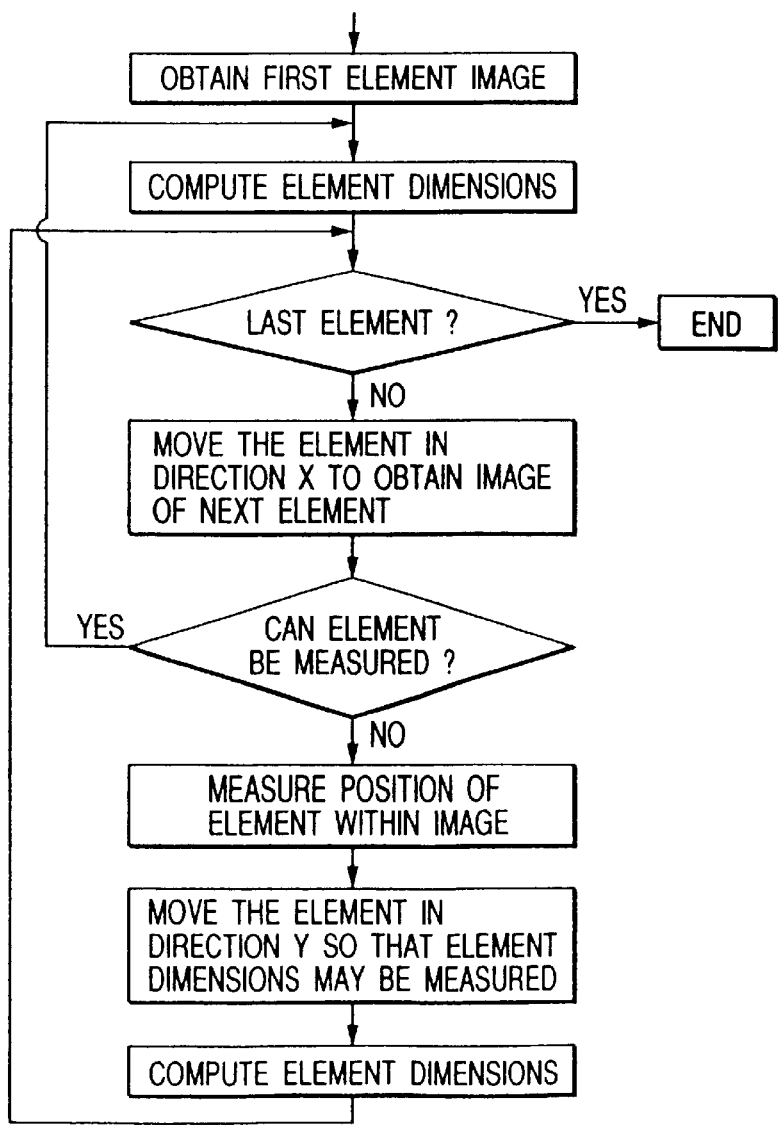
FIG. 5 is a sequence view showing an inspecting method according to a conventional system.
Figure 6A:
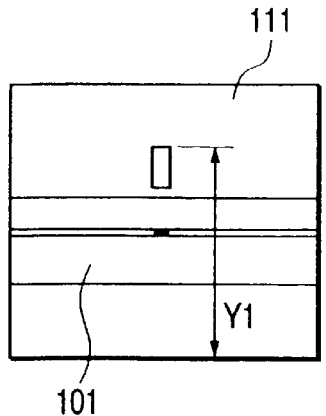
FIG. 6 is a view showing one embodiment of a detected image of a head front according to a conventional system.
Figure 6B:
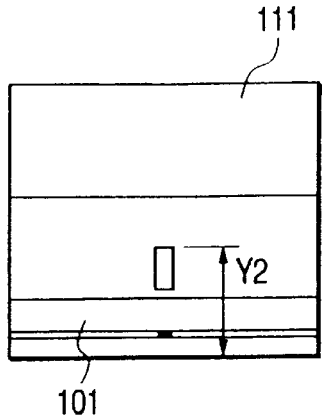
Figure 6C:
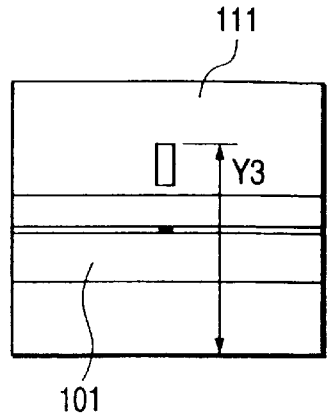
Figure 7:
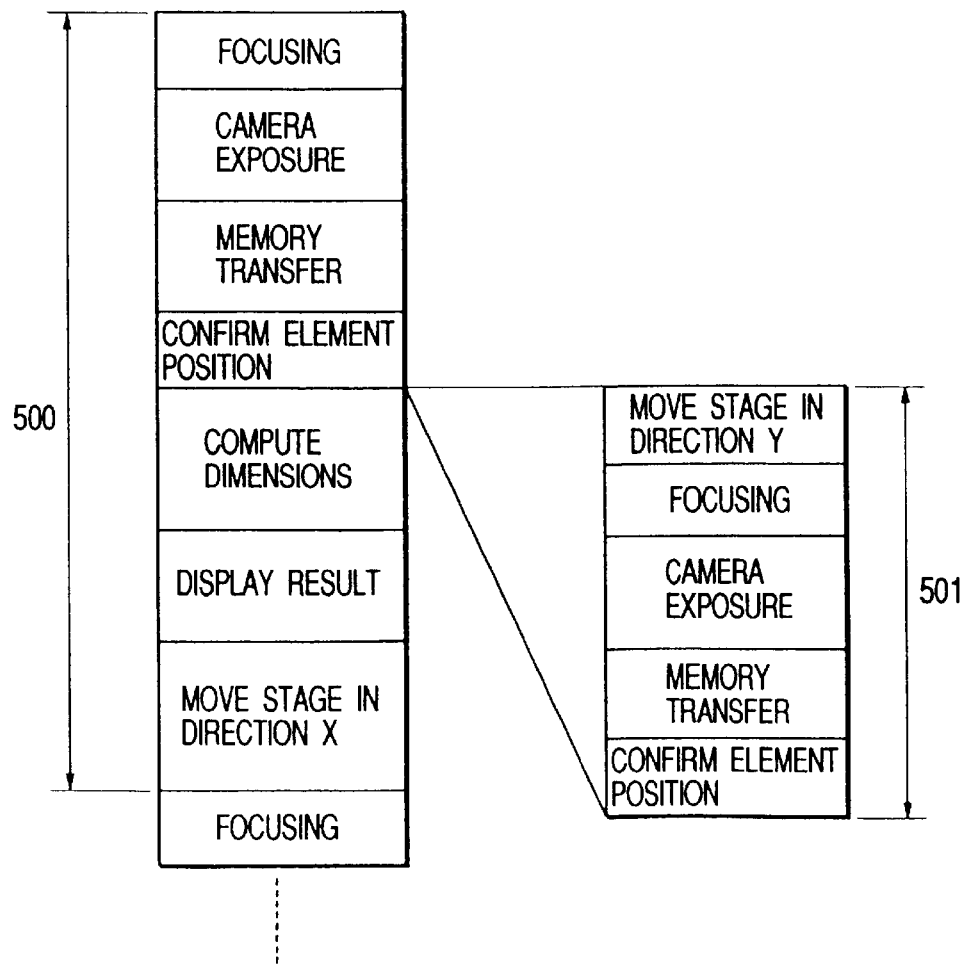
FIG. 7 is a view showing one embodiment of inspecting time according to a conventional system.

FIG. 1 shows a GMR head narrow track width measuring apparatus (hereinafter abbreviated as a track width measuring apparatus) in the first embodiment according to the present invention. The present track width measuring apparatus comprises a measurement optical system 200, an automatic focusing system 201, an image signal processing and control system 202, and a stage system 203.

It is estimated that the lateral direction of paper surface is the direction X, the direction at right angles to the paper surface is the direction Y, and the vertical direction of the paper surface is the direction Z. The stage system 203 comprises a Y stage 3, an X stage 6, a Z stage 9, and a jig (not shown) for holding a bar 2. The Y stage 3 can be moved in the direction Y by a Y stage control system 5 in a method not shown by a drive part 4. The X stage 6 can be moved in the direction X by an X stage control system 8 in a method not shown by a drive part 7. The Z stage 9 can be moved in the direction Z by a Z stage control system 11 in a method not shown by a drive part 10. A bar 2 is held by a jig (not shown) for holding the bar 2 on the Z stage 9.

The measurement optical system 200 comprises a light source 12, an objective lens 15, an image-forming lens 23, and a CCD camera 24. Light from the light source 12 is formed at the pupil 15a of the objective lens 15 by a relay lens 13 and a beam splitter 14 to Keller-illuminate an element part of the bar 2 by K hler illumination. The beam splitter 14 is provided for illumination and detected light separation. Reflecting light from the element part on the bar 2 is formed on the CCD camera 24 by the objective lens 15 and the image-forming lens 23.

The measurement optical system 200 is controlled by a microscope control system 16. The wavelength of the light source 12 used to illuminate the bar 2 includes deep ultraviolet light such as wavelength 248 nm, or ultraviolet light such as wavelength 365 nm, or visible light such as wavelength 500 nm or so. Of course, the objective lens 15, the image-forming lens 23 and the CCD camera 24, which have the efficiency according to the wavelength.

The automatic focusing system 201 comprises an illuminating sensor 19 and a division sensor 20. Light from the illuminating laser 19 within an automatic focal unit 17 obliquely illuminates the element part on the bar 2 in the objective lens 15 by a dichroic mirror 18. The reflecting light from the element part reflects the dichroic mirror 18, and is received by the division sensor 20 within the automatic focusing unit 17. Output of the division sensor 20 computes a position in the direction Z of the bar 2 by a computing circuit 21. The result of computation is controlled by the automatic focal control system 22. The dichroic mirror 18 is provided to separate the wavelength of the illuminating laser 19 different from the light source 12, for example, 780 nm.

The image signal processing and control system 202 comprises a computer 27, an interface circuit 32, a CPU 33, and a display 34. An image signal from the CCD camera 24 is converted into a digital signal by an AD converter 26, and afterwards is input into an image input circuit 28 of the computer 27. The CCD camera 24 controls the image pick-up timing, the exposure time and the like by a camera control system 25. In the computer 17, a plurality (two in the present embodiment) of operation circuits 29, 30 are provided to switch input of an image signal from the image input circuit 28 to enable the computing processing of track width of elements in parallel. Further, a position of an element within the detected image can be computed by an image position operation circuit 31.

The stage system 203, the optical system 200, the automatic focal system 201, and the image signal processing and control system 202 are controlled by the CPU 33 through the interface circuit 32. The result or the like is displayed on the display 34.

The operation of the above constitution will be described hereinafter. The objective lens 15 of the measurement optical system 200 is indispensable to the focusing with high accuracy when an image is input. In the present embodiment, the focusing is carried out by the automatic focal system 201. A parallel beam of, for example, wavelength 780 nm, emitted from a semiconductor laser 19 is reflected by the dichroic mirror 18 and is incident on the circumferential part of the pupil 15a of the objective lens 15, the beam being condensed obliquely on the bar 2 and irradiated. The reflecting light is incident on the objective lens 15 obliquely, and incident on the division sensor 20 as a parallel beam.

Figure 8A:
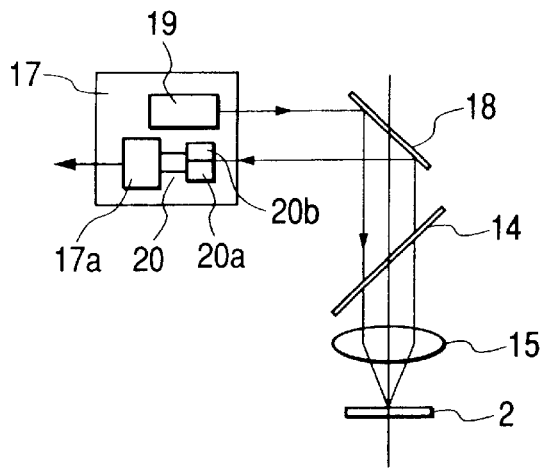
FIGS. 8(*a*) to (*c*) are respectively schematic front views of an optical system showing a focusing method of the present invention, and FIG. 8(*d*) is a graph showing a relationship between a bar position and an output of an optical system.
Figure 8B:
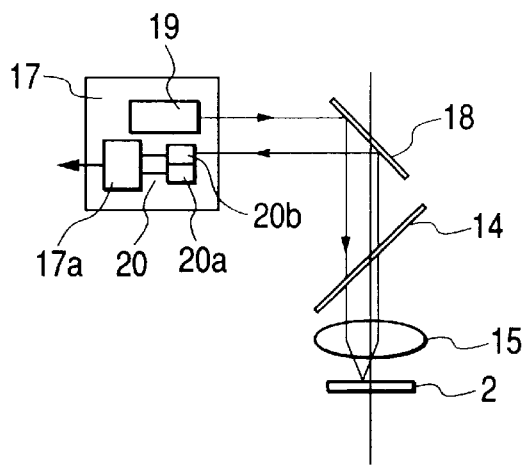
Figure 8C:
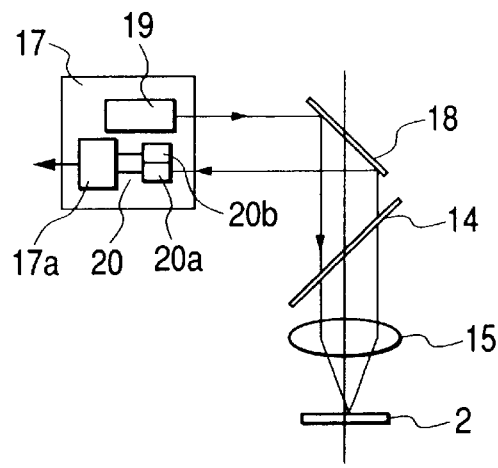

FIGS. 8(a) to 8(d) show the operation of the automatic focal system 201 with respect to the vertical change of the bar 2. FIG. 8(a) shows the state that a focal position of the objective lens 15 is adjusted to the surface of the bar 2. The division sensor 20 comprises two light receiving parts 20a and 20b. An output signal from each light receiving part is input into a differential circuit 17a, and a differential signal (for example, output of the light receiving part 20a—output of the light receiving part 20b) sensor is fed to the operation circuit 21. When the bar 2 is in the focused state, the reflecting light from the bar 2 impinges on the center part of the division sensor 20. Then, outputs of the light receiving parts 20a and 20b are the same level, and when a difference therebetween is obtained, the differential signal is 0. FIG. 8(b) shows the case where the bar 2 is moved to the vicinity of the objective lens 15, and FIG. 8(c) shows the case where the bar 2 is moved far from the objective lens 15.

Figure 8D:
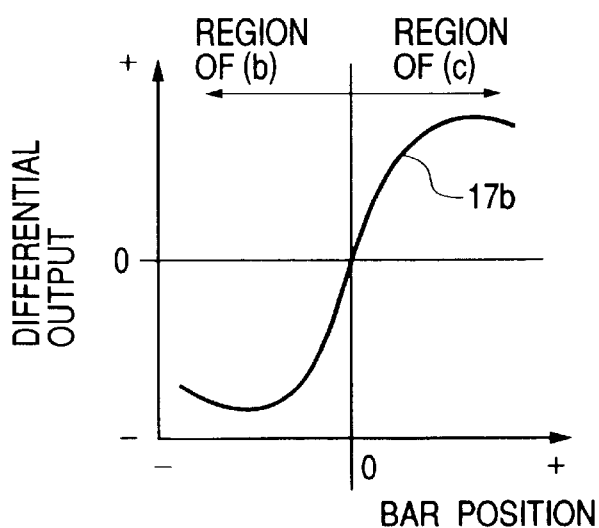

When deviated from the focal position of the objective lens 15, the opposition of the reflecting beam from the bar 2 is changed. Therefore, the outputs of the light receiving parts 20a and 20b are changed, and the output from the differential circuit 17a is changed. FIG. 8(d) shows the output change of the differential circuit 17a. The axis of abscissa indicates the amount of vertical change of the bar 2, and the axis of ordinates indicates the output of the differential circuit 17a. The position of 0 of the differential output is the focal position of the objective lens 15. The right hand in which signal is large is the case where the bar is deviated far shown in FIG. 8(c), and the left hand in which signal is small is the case where the bar is deviated near shown in FIG. 8(b). As described above, when the focal position changes, the differential signal 17b changes, and the change direction of the focal position can be grasped by the symbols of the change.

Figure 9:
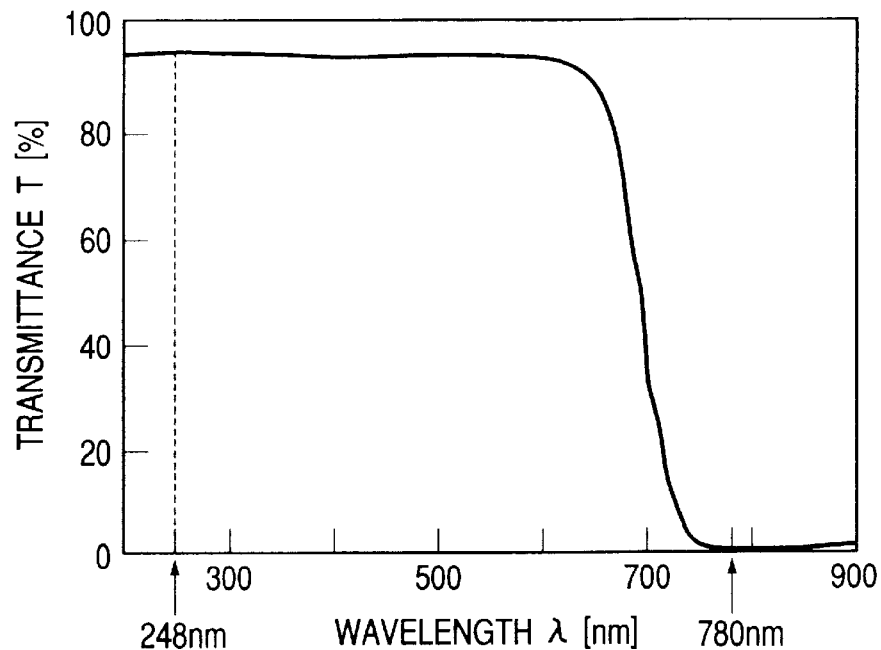
FIG. 9 is a graph showing the spectral transmittance characteristics of a dichroic mirror according to the present invention.

FIG. 9 shows the spectral transmittance characteristics of the dichroic mirror 18. Light of wavelength (for example, 248 nm) used for the image measurement transmits by about 90%, and wavelength (for example, 780 nm) of laser beam used for automatic focus reflects by about 95%. The present measurement optical system 200 is composed of a double telecentric optical system, which is less error in magnification relative to slight deviation of the focal position. The automatic focusing may be done by a system for calculating contrast of a pattern of a detected image itself, and finely adjusting the Z stage 9 so that the contract is maximum. The spectral characteristics may be changed according to the wavelength used for the image measurement and the wavelength used for automatic focusing.

Figure 10A:
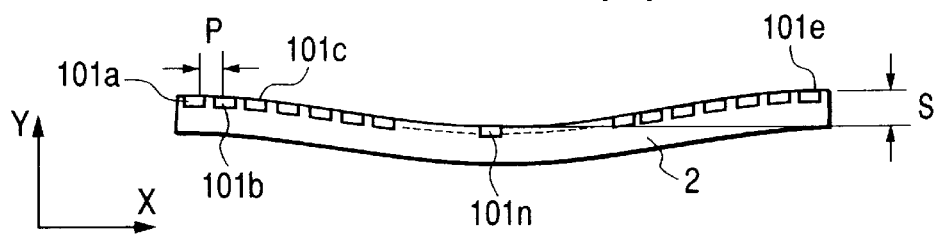
FIG. 10(*a*) is a side view of a bar showing one embodiment of a flexed shape of a bar after cut, and FIG. 10(*b*) is a view showing a relationship between a position of an element on the bar and a position in a direction Y.
Figure 10B:
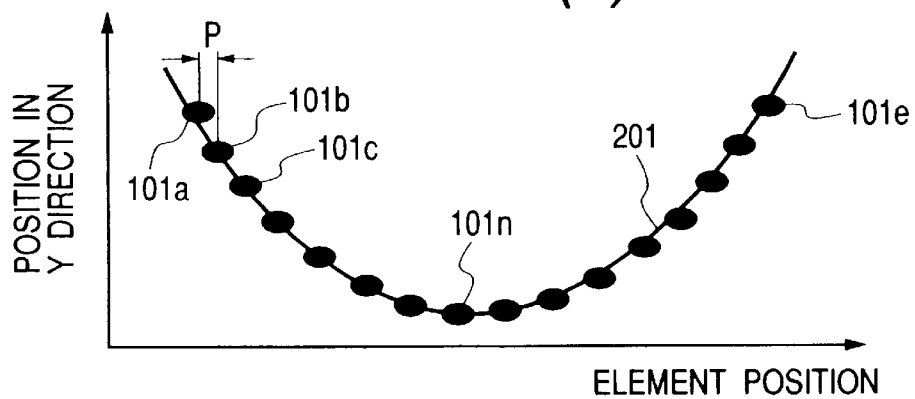

FIGS. 10(a) to 10(b) show one example of deviations resulting from the flexure of the bar 2. FIG. 10(a) is a view in which the bar 2 is viewed from the detecting direction. As described above, the bar 2 is arranged continuously from the first element 101a to 101b, 101c, . . . final 101e by pitch P.

An element in the central part is 101n. FIG. 10(b) shows the results in which the position in the direction Y of elements 101. It is understood that the change in the direction Y is small in amount of change near the center, and large in periphery. When an approximate equation is obtained from the position in the direction Y and the pitch P, the present embodiment is applied to a secondary approximate equation 201.

Figures 11A, 11B, 11C:
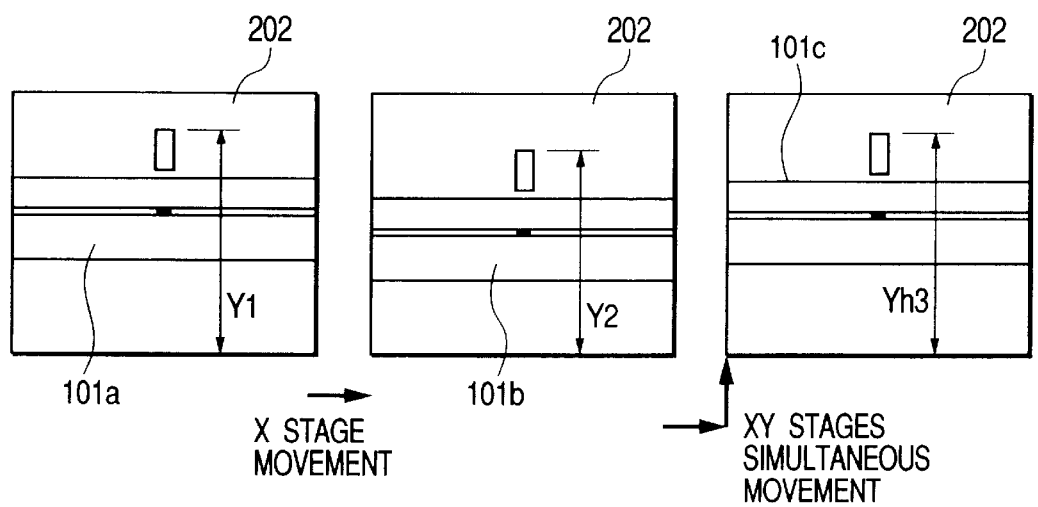
FIGS. 11(*a*) to 11(*c*) are respectively detected images of a bar side according to the system of the present invention, and FIG. 11(*d*) is a view showing a method for presuming an amount of flexure of a bar.

FIGS. 11(a) to 11(d) show one example of prediction of a position of the bar 2. FIG. 11(a) shows an image in which the element 101a is detected. The bar 2 is positioned by the X stage 6 and the Y stage 3 so that measurement items of the element 101a can be detected within the field of detecting 202. The focal position of the objective lens 15 is adjusted to the surface of the element 101a by the automatic focal system 201.

Figure 11D:
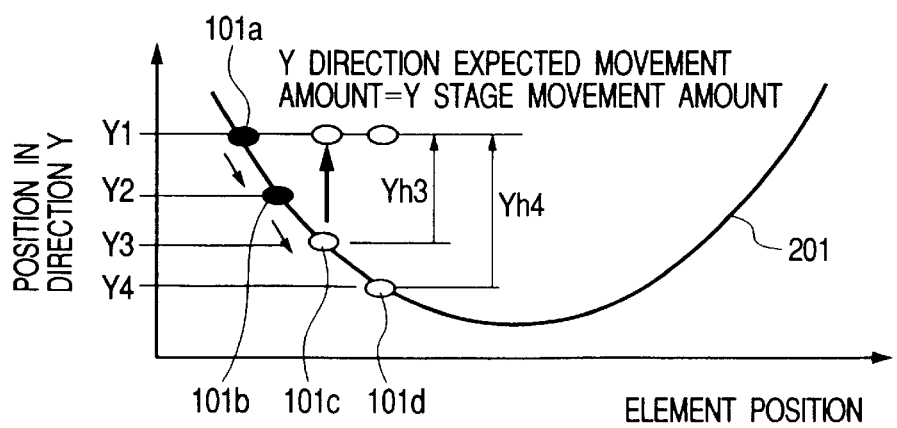

In this state, the position in the direction Y within the field of detecting of the element 101a, for example, the distance Y1 from the lower part of the screen is calculated. The bar 2 is moved in the direction X by the distance of the pitch P by the X stage 6. FIG. 11(b) shows a detected image of next element 101b. The element 101b is detected within the field of detecting 202. As described above, the element 101b is detected downward of the element 101a due to the flexure of the bar 2. Similarly, the distance Y2 from the lower part of the screen is calculated. FIG. 11(d) shows the distance in the direction Y and the approximate curve. A secondary approximate equation is derived using the change amount in the direction Y and the pitch P.

Since the next element 101c can be estimated from the approximate equation, the position after moved by the pitch P of the element 101c is estimated to be Y3, and a difference between the position of Y3 and the position Y1 of the element 101a is obtained to obtain a corrected amount Yh3.

As shown in FIG. 11(c), the Y stage 3 is moved by the distance of the corrected value Yh3 whereby the detected image of the element 101c can be detected at the same position as the element 101a irrespective of the flexure of the bar 2. The position in the direction Y and the estimated position are stored.

A secondary approximate equation is likewise further derived from the next element on the basis of the position stored to estimate positions in the direction Y after the next element, obtain the corrected value in the direction Y, and perform correction in the Y stage. The approximate equation is prepared using the previous positions of elements sequentially, which is used as a standard to enhance the accuracy of the corrected amount. Correction is performed in the Y stage simultaneously with the movement of the X stage. This operation is repetitively carried out till the final element.

While in the present embodiment, the secondary approximate equation is used, it is contemplated that a linear approximate or a high-order approximate equation is used depending on the tendency of the flexure of the bar 2. Thereby, all the elements can be detected in the center part of the objective lens 15, enabling the measurement in a nanometer order.

Figure 12A:
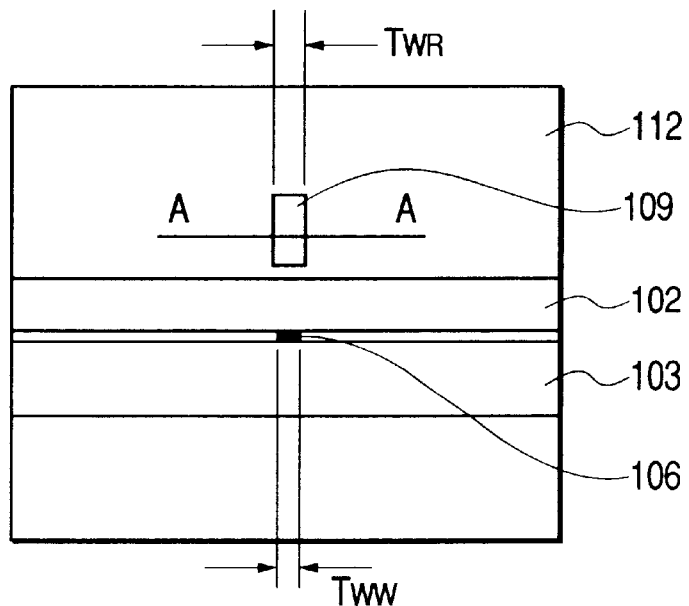
FIG. 12(*a*) is a detected image of a bar side, and FIG. 12(*b*) is a view showing a differential waveform taken on A—A section.
Figure 12B:
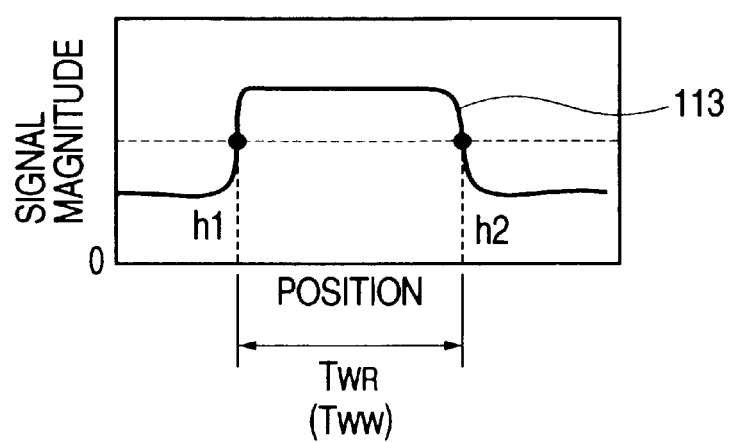

Next, the measuring method for track width which is an object of measurement will be described below. FIGS. 12(a) to 12(b) are an example of an image detected by the track width measuring apparatus in which the GMR head as an example of the object of measurement is shown in the present embodiment. FIG. 12(a) shows the entirety of the detected image. In the detected image 112 are detected a read track 106, a right track 109, an upper shield 102, and a lower shield 103. The focal point is adjusted to the surface layer of the bar 2 by the automatic focal system. FIG. 12(b) shows a signal taken on section A—A of an image. An image signal 113 in which edge in the direction of track width is detected is obtained. Points of intersection h1 and h2 when set to a certain level are obtained relative to the signal, and track widths (TWR, TWW) are obtained. Further, a difference between the center position of the read track 106 and the center position of the right track 109 is obtained to enable obtaining an offset amount between both the tracks.

By the above-described operation, movement-stop-image input-computing processing is repeated by step-and-repeat scanning control of the X stage 6 and the Y stage 3. When the image input is terminated with respect to all the elements of the bar 2, the bar is moved to a removing position by the X stage 6 and the Y stage 3. The next bar 2 is set, and moved again to a detecting position by the X stage 6 and the Y stage 3 to repeat measuring. Respective dimensions and variations are displayed on the display 34 as measured results for track width and the like.

Figure 13:
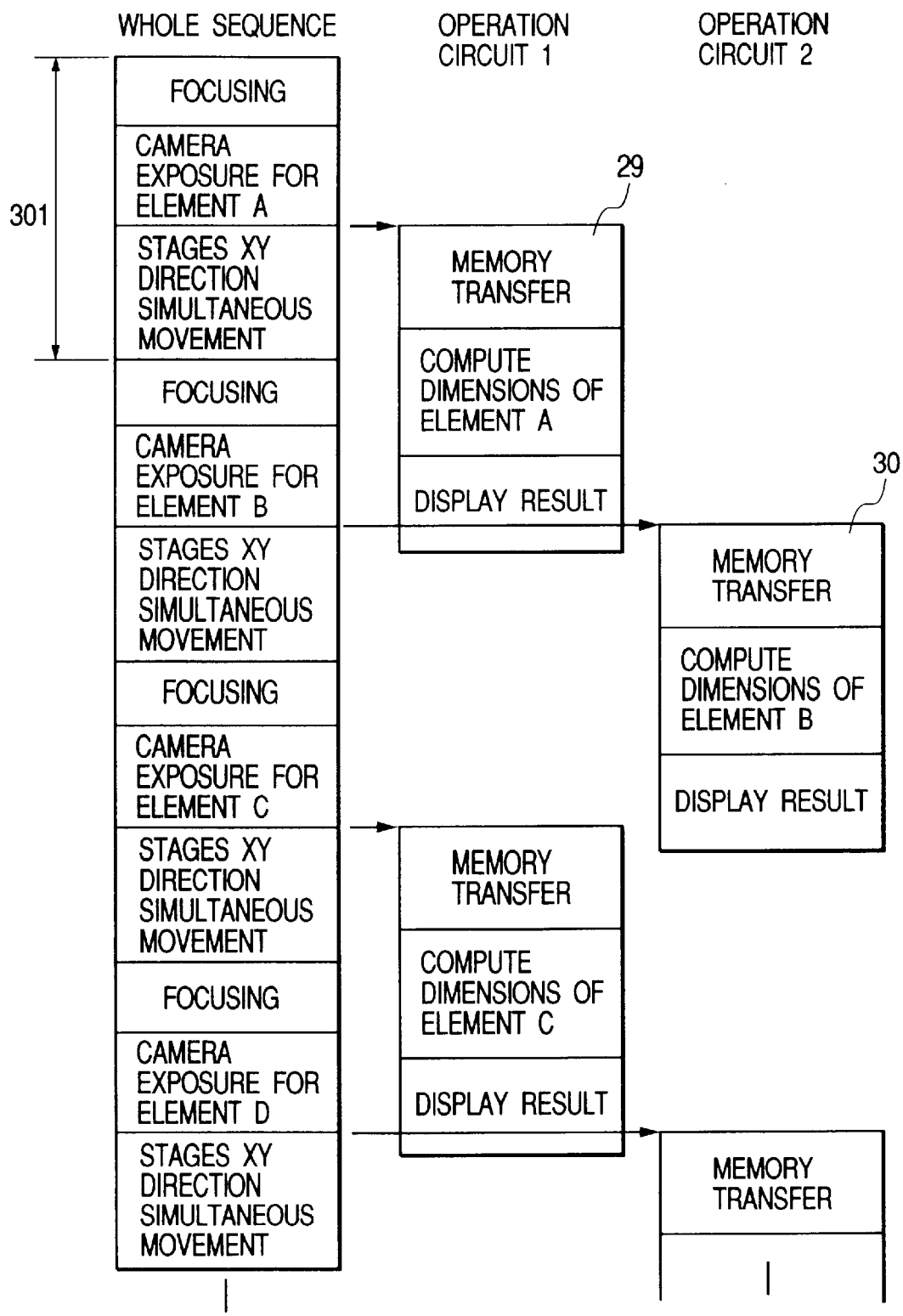
FIG. 13 is a view showing one embodiment of the measuring procedure according to the present invention.

FIG. 13 shows one example of the measuring procedure in the present embodiment. First, the whole sequence will be described. The bar 2 is adjusted to the focusing position by the automatic focal system 201. The element 101 is image-picked up by the camera 24, and a signal thereof is transferred to the memory 28 within the computer 27. The X stage 6 and the Y stage 3 are simultaneously moved to the movement of the pitch P to the next element and the distance for correcting the flexure amount of the bar 2. The bar 2 is again adjusted to the focus point by the automatic focal system at that position (next element) to effect the camera exposure. This operation is repeated. When the camera exposure is finished, the memory transfer within the operation circuit 29, the dimensions operation, and the result display are carried out in a separate sequence. A plurality of operation circuits 29 are provided. The operation circuit 30 sets up a sequence similar to the operation circuit 29.

As described above, in the computation of element A, computation of dimensions of element A can be carried out by the operation circuit 29, and computation of dimensions of element B can be carried out by the operation circuit 30. In the computation of element C, since the computation of element A is terminated before memory transfer in element C, the memory transfer can be carried out promptly. The exposure of elements and movement of stages are enabled continuously irrespective of the computation time of element dimensions. The detecting time 301 per element is substantially the time from the focusing to the termination of stage movement. The last element will receive serial operation since no next element exists, but this computation is carried out during operation for taking out elements, and the time is not substantially extended.

Figure 14:
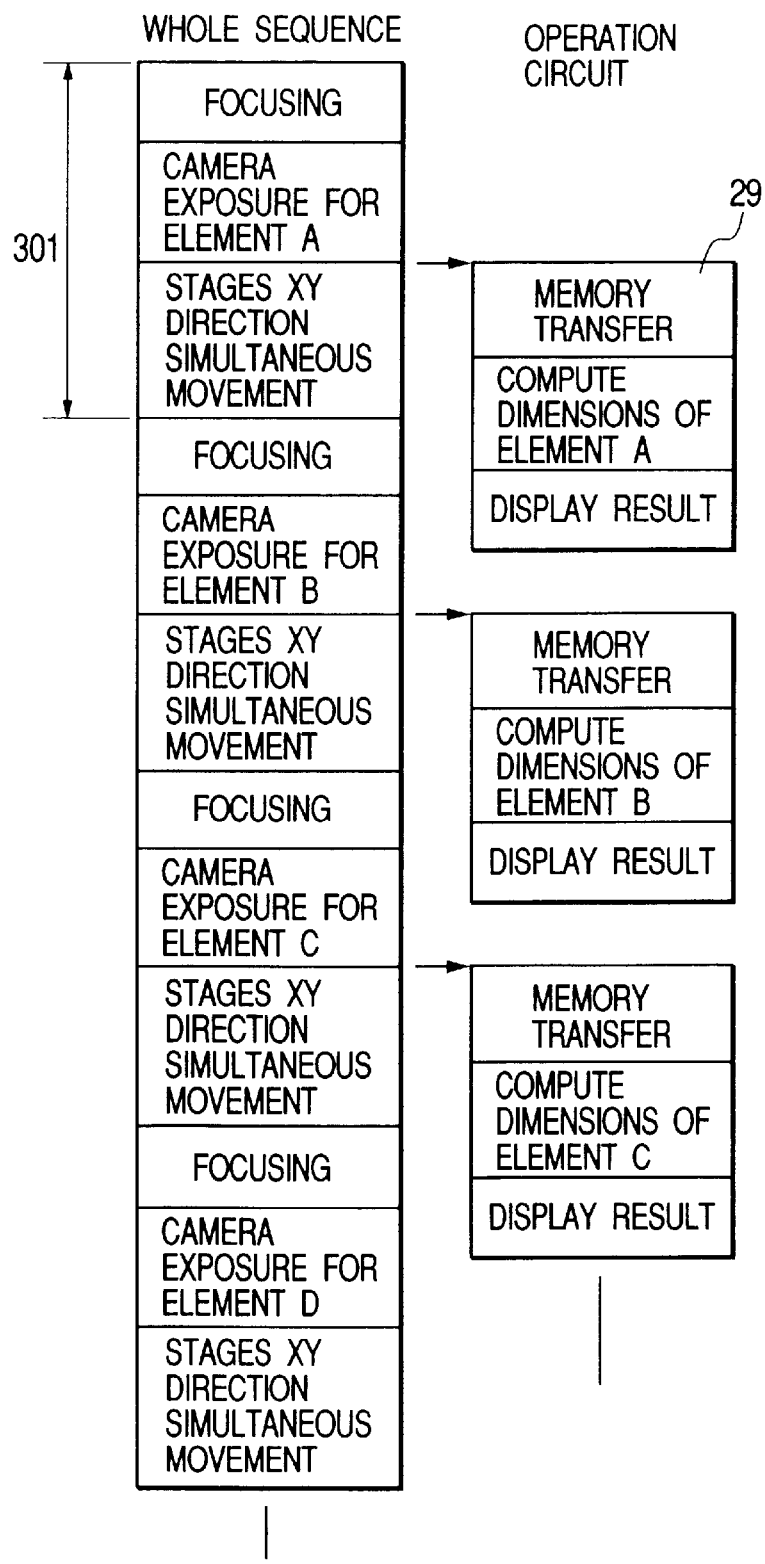
FIG. 14 is a view showing a further embodiment of the measuring procedure according to the present invention.

While in the present embodiment, a description has been made of an example in which a plurality of operation circuits are provided, it is noted that where the operation circuit is terminated till detection of the next element due to higher speed of operation circuit, it is not necessary to provide a plurality of operation circuits. FIG. 14 shows one example. A signal is transferred to the memory of the operation circuit 29 after termination of camera exposure, similarly to FIG. 13. Computation of dimensions of elements and display of results are terminated by the memory transfer of camera exposure of the next element. Thereby, the operation circuit 29 can be realized by one circuit. Detecting time 301 per element is similar to FIG. 13.

Figure 15:
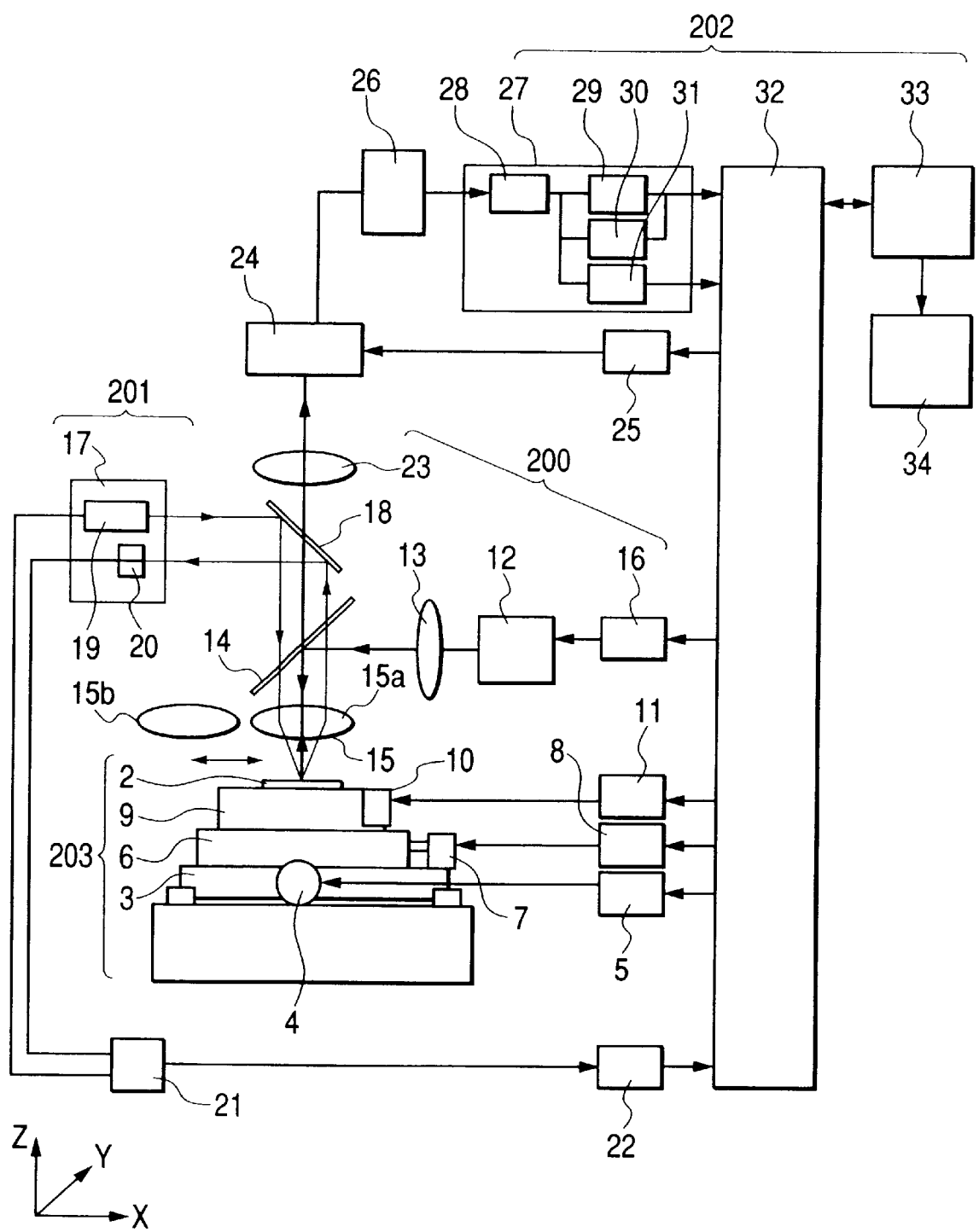
FIG. 15 is a front view showing the schematic constitution of a track width measuring device according to a first embodiment of the present invention.

A second embodiment is shown in the drawing. FIG. 15 is a view of the entirety of the second embodiment. An automatic focal system 201, a computing system 202, and a stage system 203 are similar in constitution to FIG. 1. An optical system 200 has a low magnification objective lens 15b and a high magnification objective lens 15. The detecting field of the low magnification objective lens 15b is 10 times of that of the high magnification objective lens 15. Further, it has the detecting range capable of sufficiently detecting the flexure amount of the bar 2. The high magnification objective lens 15 and the low magnification objective lens 15b can be switched by the microscope control system 16 as occasion demands. Other constitutions are similar to FIG. 1.

Figure 16A:
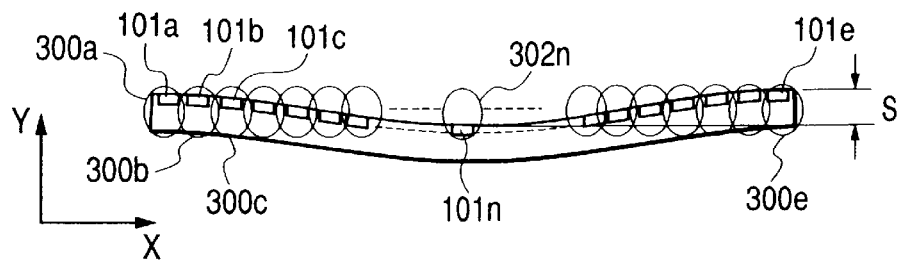
FIG. 16(*a*) is a side view of a bar showing a second method for presuming an amount of flexure according to the present invention, and FIG. 16(*b*) shows a relationship between a position of an element on a bar and a position in a direction Y of each element.
Figure 16B:
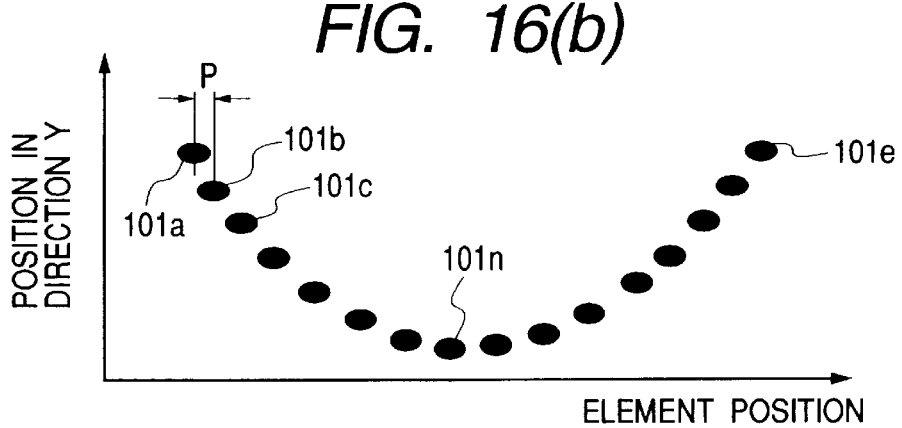

The operation will be described with reference to FIGS. 16(a) to 16(b). FIG. 16(a) is a view in which the bar 2 is viewed from the detecting direction. First, the lens is switched to the low magnification objective lens 15b. As shown in FIG. 16(a), all elements are detected by the low magnification objective lens 15b to obtain an amount of deviation in the direction Y of element. An element 101a is detected by a detecting range 300a to detect a position in the direction Y of the element 101a. The X stage is moved by pitch P, and an element 101b is detected by a detecting range 300b to detect a position in the direction Y of the element 101b. This operation is repetitively carried out with respect to all elements to store positions in the direction Y of all elements.

At that time, the detecting field of the objective lens 15b is wider than the flexure S of the bar 2. That is, the stage is not caused to be moved in the direction Y. FIG. 16(b) shows a positional relationship in the direction Y of all elements detected. Next, switching is made from the low magnification objective lens 15b to the high magnification objective lens 15. Since the amount of deviation in position in the direction Y of each element can be calculated, all elements are detected while correcting the amount of movement of each element and while simultaneously moving the distance of pitch P in the X stage 6.

Figure 17A:
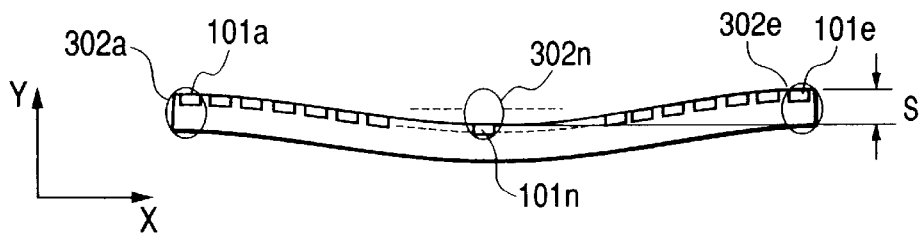
FIG. 17(*a*) is a side view of a bar showing a third method for presuming an amount of flexure according to the present invention, and FIG. 17(*b*) shows a relationship between a position of an element on a bar and a position in a direction Y of each element.
Figure 17B:
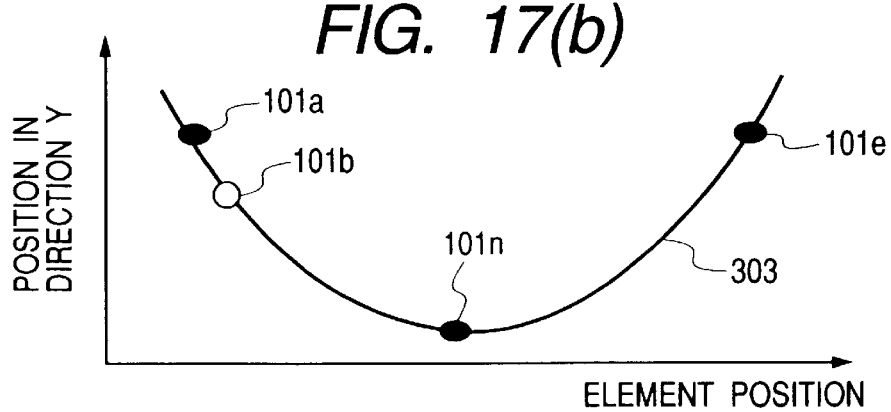

The similar effect can be obtained even by the method shown in FIGS. 17(a) to 17(b). FIG. 17(a) is a view in which the bar 2 is viewed from a detecting direction. The low magnification objective lens 15b is used for detection similar to FIG. 16. In the present embodiment, elements in both ends 101a, 101e, and a central part 101n are detected, and an amount of deviation in position in the direction Y is obtained by the element. FIG. 17(b) shows a positional relationship between each element and a position in the direction Y. A secondary approximate curve 303 is obtained using the amounts of deviation in position at three points and the distance between the elements. Since the pitch P of each element is constant, a portion from the position at the first element 101a to the position in the direction Y of the next element 101b can be estimated by the secondary approximate curve. This estimated amount is used as the corrected amount. Next, switching is made from the low magnification objective lens 15b to the high magnification objective lens 15. All elements are detected while correcting the Y stage 3, in accordance with the above-described corrected amount, and while simultaneously moving the distance of pitch P in the X stage 6.

Figure 18:
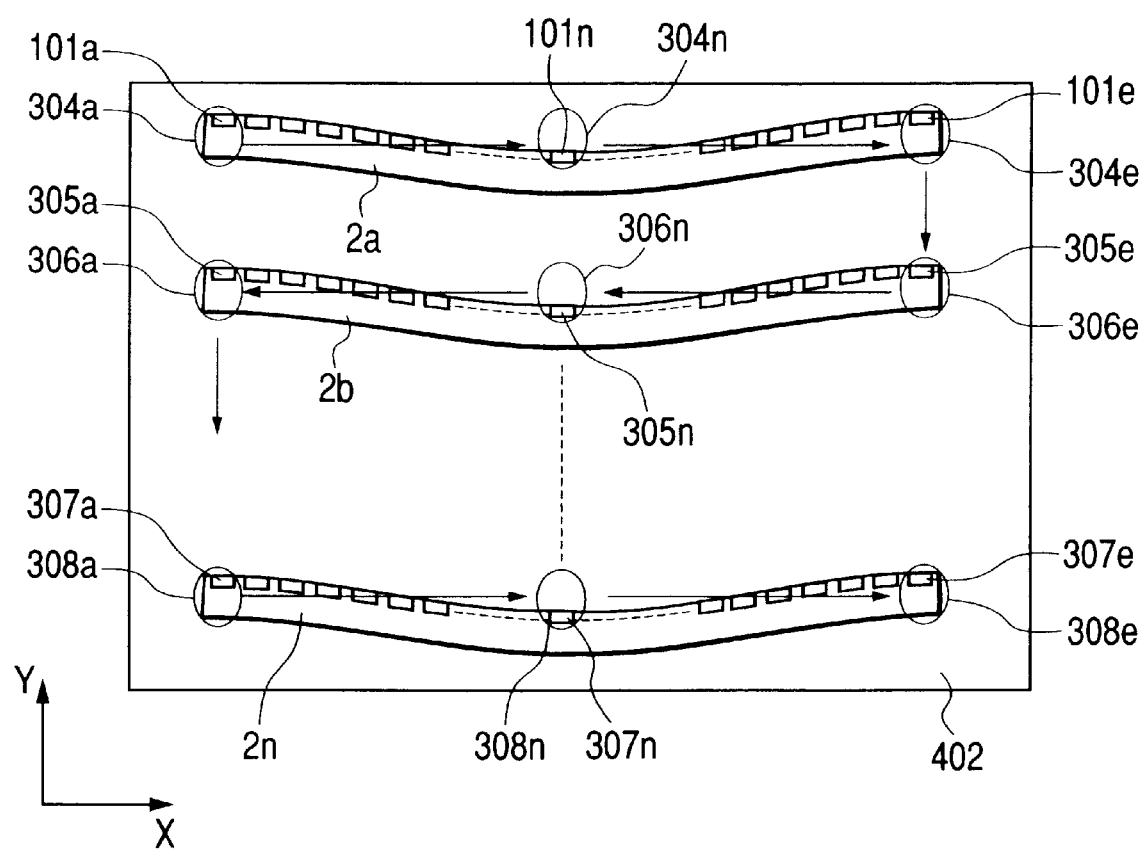
FIG. 18 is a side view of a bar showing a fourth method for presuming an amount of flexure according to the present invention.

While in the above-described embodiment, a description has been made of a case of a single bar 2, it is noted that this can be also applied to a case where a plurality of bars 2 are arranged. FIG. 18 shows an embodiment of a case where a plurality of bars 2 are arranged, which is a view in which the bars are viewed from a detecting direction. A plurality of bar 2 is loaded on a jig 402. Detecting is made by the low magnification objective lens 15b, similar to FIG. 17. In the present embodiment, elements in both ends 101a, 101e, and a central part 101n are detected, and an amount of deviation in position in the direction Y is obtained by the element. A secondary approximate curve in the bar 2 is obtained.

Next, elements in both ends 305a, 305e, and a central part 305n are detected, and an amount of deviation in position in the direction Y is obtained by the element. A secondary approximate curve in the bar 2b is obtained. All elements are detected using the secondary approximate curve according to the bars, while making correction in the Y stage 3, and further while simultaneously moving the distance of pitch P in the X stage 6, in accordance with the aforementioned corrected amount by the method explained in FIG. 17.

Figure 19:
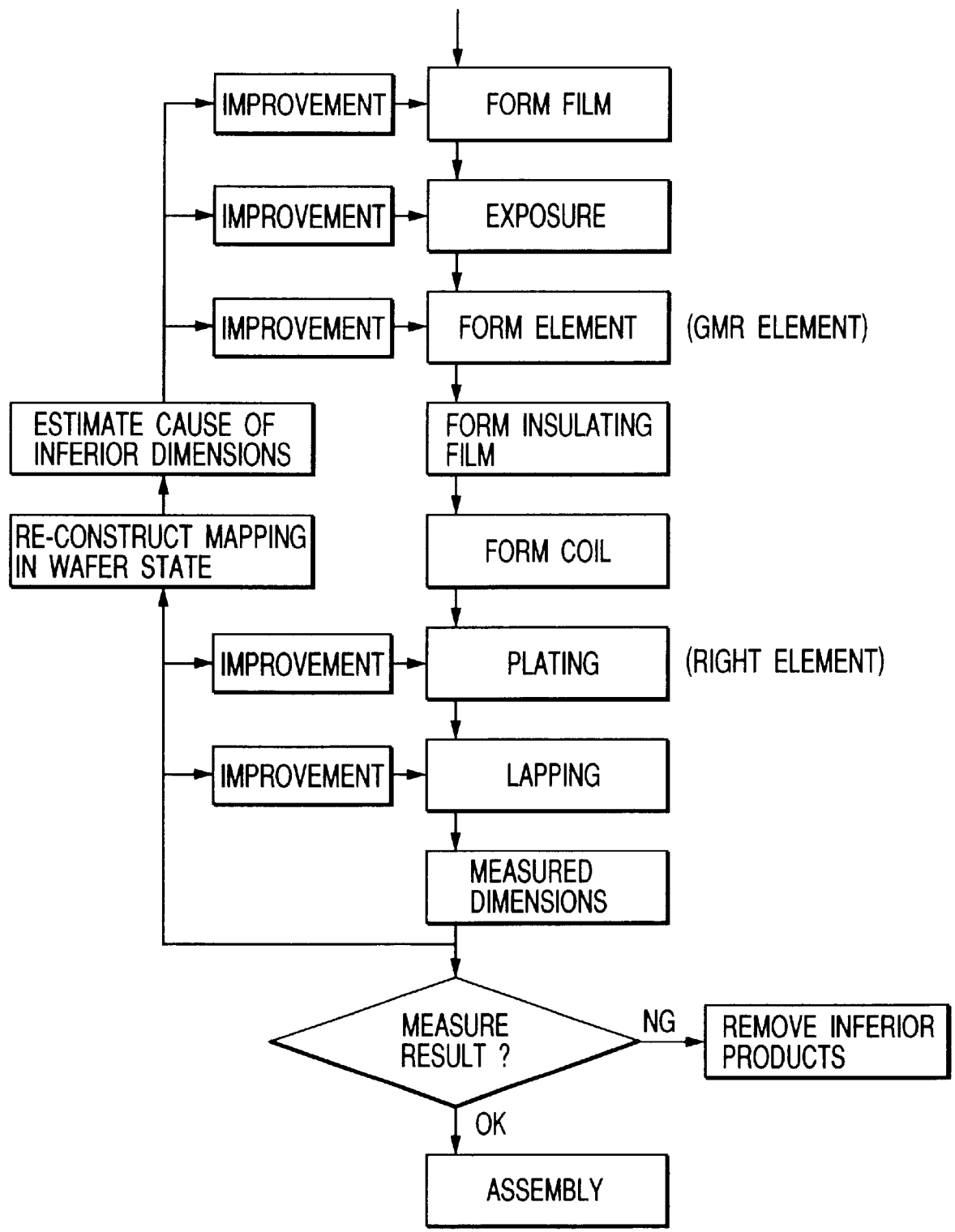
FIG. 19 is a flow chart of the manufacturing step showing one embodiment applied to the manufacturing step of the present invention.

FIG. 19 shows one embodiment of the step for processing a head. When the track width dimensions, the variations, and the amount of displacement of center of the track measured in the track width measuring apparatus explained above exceed a fixed value, the corresponding bars 2 and the element numbers within the bars 2 are displayed, and the inferior products are removed so as not to be moved to the next processing step and only the good products are moved thereto. Further, mapping in the wafer state is reconstructed from the result of measurement of dimensions in the bar state, and the dominant cause of inferior dimensions is estimated to specify the step that need be improved. Instructions for improvement are given to the specified step.

Figure 20:
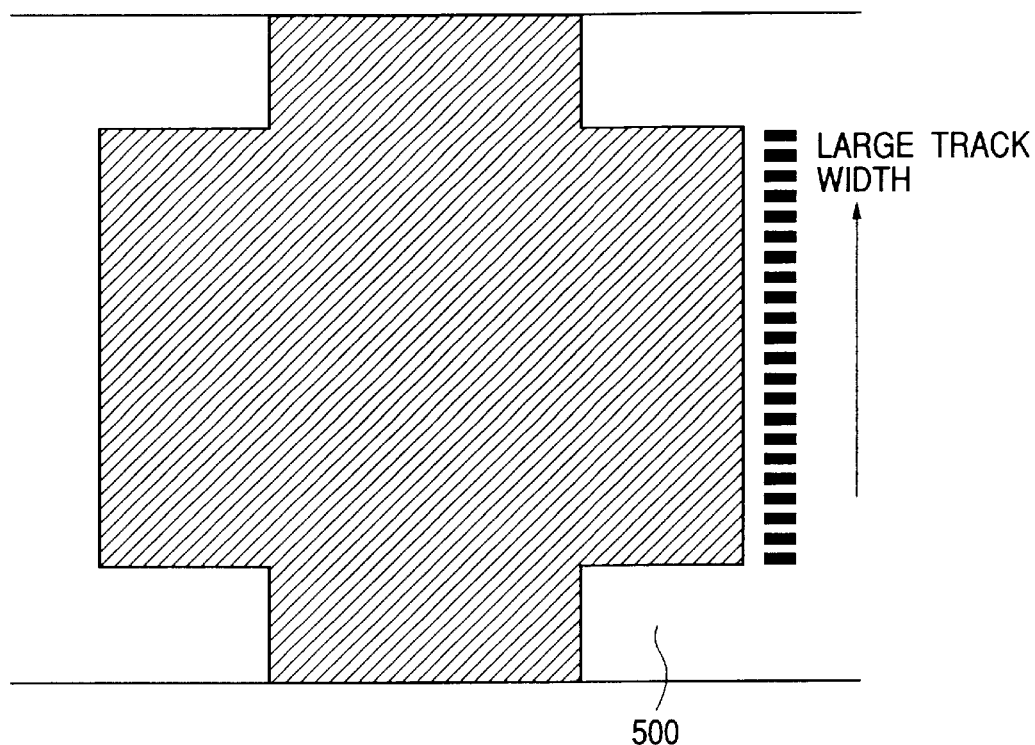
FIG. 20 is a plan view of a wafer showing one embodiment in which a change in dimensions of track width is subjected to mapping on the wafer on the basis of the result measured according to the present invention.

FIG. 20 shows one embodiment in which the change in dimensions of track width is mapped on the wafer. In the figure, dimensions of track width are classified by dimensions. Mapping is applied to the wafer on the basis of the value of the classification so as to correspond to the bars prior to cutting shown in FIGS. 2(a) to 2(c) to form an image 500.

The dominant cause of inferior dimensions is estimated from values of variations in dimensions on the basis of the mapping result. On the basis of the dominant cause of inferior dimensions, an exposure device, a resist coating device, a film forming device and the like in the element forming step are improved to find inconvenient early and minimize uneven illuminance, as shown in FIG. 19. There is carried out the feedback such as correction of a process parameter such as fine adjustment of membrane pressure, which is applied to process management and control. For example, variation in dimensions caused by variation in film thickness, local variation in focus of an exposure device (adhesion of foreign matter on the chuck), and variation in illuminance can be estimated from data subjected to mapping.

Further, accumulated data obtained by the apparatus can be used for monitoring and analyzing variation in dimensions and unevenness for a long period. Thereby, it is possible to enhance the yield and maintain the high yield.

While in the present embodiment, a description has been made taking the GMR head as an example, it is note of course that the embodiment can be also applied to the MR head.

Figure 21:
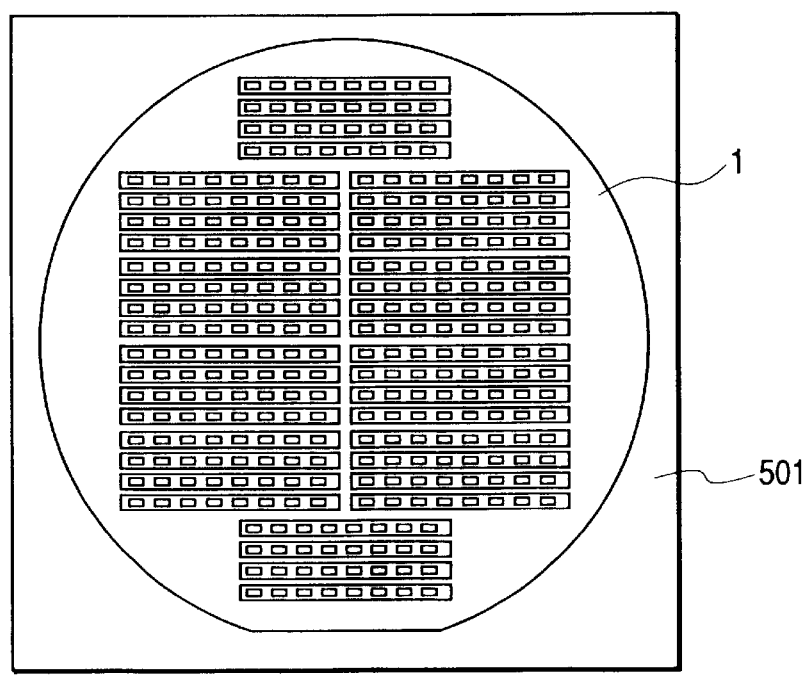
FIG. 21 is a plan view of a wafer.

Also in the production process for semiconductors, there can be obtained similar effects in the aforementioned method. That is, as shown in FIG. 21, measurement of line width of a chip 501 is continuously carried out in the state of wafer 1 to enable measurement of regular variations. On the basis of this result, mapping as shown in FIG. 20 is carried out whereby the cause of inferiority resulting from variations in process can be estimated to apply it to management and control of the semiconductor process such as exposure and development. With respect to the method of measurement of line width, calculation can be made by the method as described above.

As described above, according to the embodiments of the present invention, in the production line in the GMR head forming process, measurement with high precision and in a short time of track width in the state formed to be bar-like becomes enabled to obtain the effect that the state of the element forming step can be monitored in the in-process. Further, mapping in the wafer state becomes enabled, and inconvenience of process in the element step is found early and a process parameter is improved to thereby obtain the effect of making it possible to reduce occurrence of inferior products and maintain high yield.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A manufacturing method for a thin film magnetic head comprising the steps of:

forming a plurality of thin film patterns corresponding to a plurality of thin film magnetic head elements on a substrate;

cutting the substrate formed with the plurality of thin film patterns to cut out a group of thin film magnetic head elements;

measuring dimensions of a predetermined part of the thin film patterns for the group of thin film magnetic head elements separated;

selecting a group of thin film magnetic head elements as acceptable, based on a result of measurement; and feeding the group of acceptable thin film magnetic head elements selected to a subsequent step;

wherein in the step of measuring dimensions, images of each said thin film magnetic head element are sequentially picked up by sequentially moving said thin film magnetic head elements along a longitudinal direction of said thin film magnetic head elements with a constant pitch and in a Y direction perpendicular to the longitudinal direction over a distance which is estimated by using information of a previously measured value of said predetermined part of the thin film patterns.

2. The manufacturing method for a thin film magnetic head according to claim 1, wherein in the measuring step, dimensions corresponding to a track width of the thin film magnetic head are measured, the measurement of dimensions corresponding to the track width is carried out for all of the thin film magnetic head elements constituting the group of thin film magnetic head elements separated in the cutting step, and the group of thin film magnetic head elements in which the dimensions corresponding to the track width are within a predetermined range as determined by said measuring step is fed as acceptable to the subsequent step.

3. The manufacturing method for a thin film magnetic head according to claim 1, wherein in the measuring step, dimensions corresponding to a track width of the thin film magnetic head are measured, and the measurement of dimensions corresponding to the track width is sequentially carried out for all of the thin film magnetic elements constituting the group of thin film magnetic head elements separated in the cutting step.

4. The manufacturing method for a thin film magnetic head according to claim 1, wherein in the step of measuring dimensions of the predetermined part of the thin film patterns, an image of a section of the substrate including the plurality of thin film patterns is picked up and from the image the measurement of the dimensions is carried out.

5. The manufacturing method for a thin film magnetic head according to claim 1, wherein dimensions of the predetermined part of the thin film patterns are measured by illuminating the thin film patterns with either one of a deep ultraviolet light including a wavelength of 246 nm or an ultraviolet light including a wavelength of 365 nm.

* * * * *